March 6, 1956  R. B. POTTER  2,737,411
INFLATABLE STREAMLINING APPARATUS FOR VEHICLE BODIES
Filed Aug. 21, 1952

INVENTOR.
RALPH B. POTTER.
BY Willard S. Grow
ATTORNEY

United States Patent Office 2,737,411
Patented Mar. 6, 1956

2,737,411

INFLATABLE STREAMLINING APPARATUS FOR VEHICLE BODIES

Ralph B. Potter, Boulder, Colo.

Application August 21, 1952, Serial No. 305,594

3 Claims. (Cl. 296—1)

This invention pertains to improvements in inflatable streamlining apparatus for land, air, and marine vehicles and the like, and is particularly directed to an elastic inflatable streamlining apparatus for decreasing the slip stream power loss and retardation of the apparatus to which it is applied.

One of the problems in vehicles of all kinds, particularly automobiles, station wagons, trucks, and the like operating through a fluid medium such as the atmosphere on a highway travelling at high speed, is that the sharp projections on the front and flat backs and other portions of the vehicle normal to the direction of slip stream, causes retarding or braking action in the forward movement of the vehicle with consequent loss of speed and power. It is furthermore found impractical to properly streamline such vehicles because of the length limitations imposed by traffic codes so that streamlining has not been practical in the past for such devices.

One of the objects of the present invention is to provide an improved inflatable streamlining apparatus for a vehicle which may be blow up pneumatically or by other fluid medium and suitably supported by collapsible mechanical means and/or the like, so as to present the proper exterior streamline surface to the direction of air movement and which apparatus may be readily deflated and retracted to a withdrawn position so that when the vehicle again travels in traffic or restricted space no interference by the streamlining usable at high speed results.

A further object of this invention is to provide an improved streamlining apparatus for a vehicle including a collapsible cover material to form the streamlined shape desired together with mechanical structural means for extending the cover material to streamline form or for retracting the cover material to a collapsed position.

It is also an object of this invention to provide a suitable canopy of flexible collapsible material for a surface to be streamlined which may be extended to streamlined position by pneumatic inflation or by the use of suitable fluid inflating medium in which the canopy forms the sole means to form the streamlined surface when inflated.

Another object of this invention is to provide streamlining for the front and rear portions of a vehicle comprising an extendable and collapsible envelope or canopy which presents a streamlined surface when in extended position and which may be withdrawn to a retracted out-of-the-way position when collapsed.

Further, it is an object of this invention to provide a streamlining apparatus for any surface of a vehicle moving through a fluid medium consisting of an extendable and retractable envelope together with fluid and/or mechanical means for extending the envelope to streamlined position and to allow collapse of said envelope to a retracted position.

Still another object of this invention is to provide an inflatable streamlining apparatus attachable to a surface normal to the direction of fluid movement which may be inflated to give a substantially perfect streamline form to said surface and which may be deflated and automatically retracted to a withdrawn position when not required.

Further features and advantages of this invention will appear from a detailed description of the drawing in which.

Figure 2:
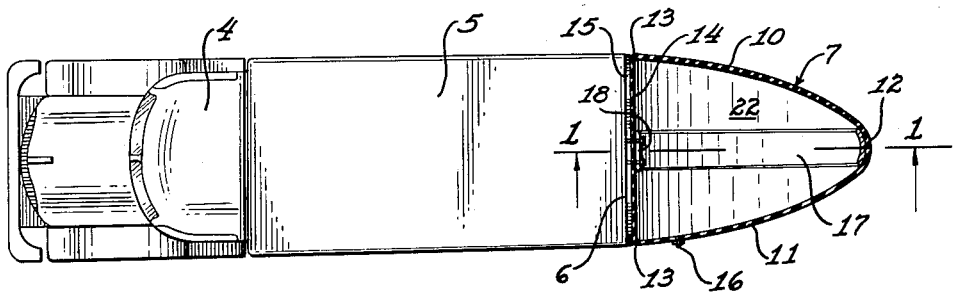
Fig. 2 is a plan view of the subject matter of Fig. 1 partly in section on line 2—2 of Fig. 1.

As illustrative of one embodiment of this invention there is shown a motor vehicle such as a truck having a frame 1 and suitable road wheels 2 and 3, the cab 4, and the main load-carrying body 5. Ordinarily, in vehicles of this type it is customary to have doors forming a flat back at 6 lying in a plane normal to the direction of travel of the vehicle and the slipstream of air moving over the vehicle.

In applicant's arrangement there is provided an inflatable streamlining apparatus indicated generally at 7 which may preferably be formed from plastic or rubber materials of suitable elastic character so as to form an envelope or balloon comprising the lower and upper portions 8 and 9 respectively and the side portions 10 and 11. All of these portions terminate in a continuous closed outer rear streamlined end 12. The inner or front edges 13 of the aforementioned sides and bottom surfaces terminate in a suitable lining end such as 14 which is secured to a suitable frame 15 which may be secured to the rear surface 6 of the vehicle body 5. The whole member comprising the portions 8, 9, 10, 11, and 14 forms a complete fluid tight body for the reception of compressed air through a suitable valve stem such as commonly used for tire tubes which is indicated at 16. Thus, the usual tire inflating pressure hose may be applied to the valve stem 16 to apply suitable air pressure to the envelope 7 to inflate it to form the desired streamline form behind the surface 6 of the vehicle so that its rapid forward movement is substantially unimpeded by the otherwise suctional drag movement that would be present were only the surface 6 exposed at the rear of the vehicle. It is also within the realm of this invention to provide a suitable pressure pump or air-supply tank on the vehicle itself for applying the necessary fluid pressure in the envelope 7 to inflate it to desired shape.

Figure 1:
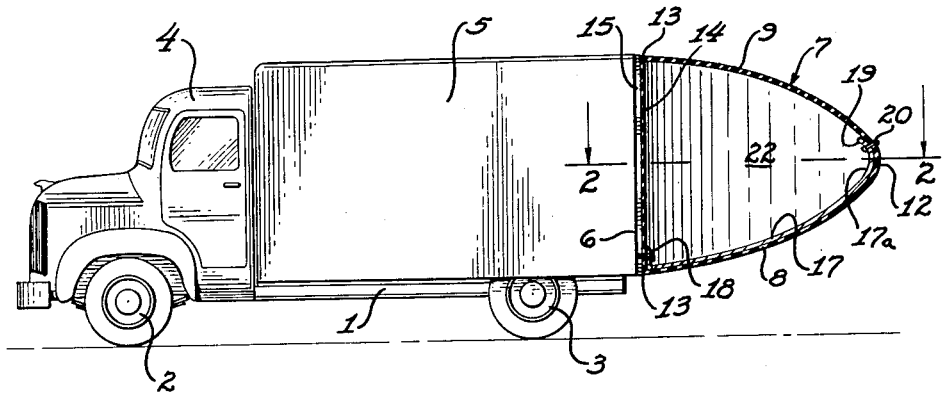
Fig. 1 is a side elevation of a motor vehicle, partly in section on the line 1—1 in Fig. 2 showing an embodiment of this invention.
Figure 3:
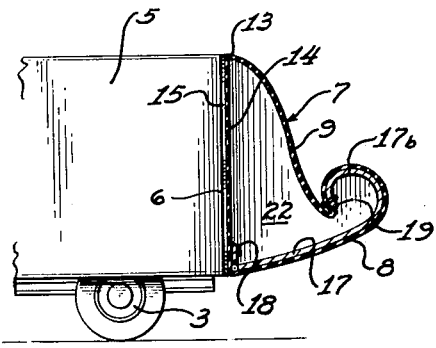
Fig. 3 is a fragmentary side elevation of the apparatus shown in Fig. 1 showing the inflatable streamlining apparatus in partly retracted condition.
Figure 4:
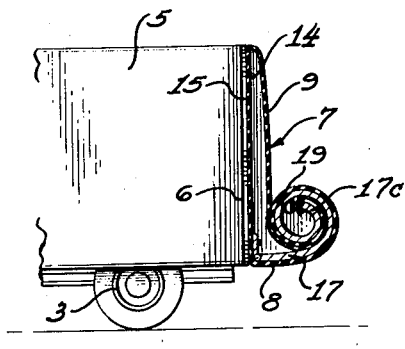
Fig. 4 is a fragmentary view similar to Fig. 3 but showing the inflatable streamlining apparatus in fully retracted position.

One of the problems of a device of this type is to make it readily collapsible and retractable so that the vehicle is readily usable in close quarters in traffic while at the same time the streamlining device is readily available for inflation and use during high speed open-country road driving. To this end there is provided a retracting means such as the coil spring indicated at 17 which is secured by a suitable folding means 18 to the frame 15 attached to the back 6 of the motor vehicle. Normally the spring 17 rolls up to the condition indicated at 17c, Fig. 4. The outer end 19 is suitably secured by a bolt 20 or by vulcanizing to the inside of the portion 12 of the envelope 7 so that as air is allowed to escape from the inside cavity 22 of the envelope 7 the spring 17 will begin to coil up from its fully inflated position 17a through intermediate positions such as at 17b till it finally arrives at fully retracted positions 17c in Fig. 4. In the latter position of Fig. 4 it is apparent that the streamlining is completely retracted and in no way interferes with the manipulation of the vehicle in close quarters. When full air pressure is applied to the chamber 22 the spring straightens out to the position 17a so as to allow the streamlining envelope 7 to assume its correct streamline form as shown in Fig. 1.

It is to be clearly understood that there is merely shown by way of example an application of this invention to a truck or motor vehicle and it is to be readily understood that it can be used with equal facility on aircraft, railroads, and on under-water vehicles of all kinds if desired while not departing from the spirit of this invention.

Having thus fully described this invention and its numerous attendant advantages, it is obvious that many changes may be made in the form, construction and arrangement of the parts without departing from the spirit or scope of the invention or sacrificing its attendant advantages, the form herein described being a preferred embodiment for purposes of exemplifying this invention.

The invention is claimed as follows:

1. A streamlined inflatable envelope for a flat transverse surface of a motor vehicle or the like including a streamlined envelope having, a bottom portion, a top portion, and side portions formed integrally with and terminating in a rear end streamlined section, an inner integral portion on said envelope located adjacent said flat transverse surface, means for mounting said inner integral portion against said flat transverse surface to be modified so that said flat transverse surface supports said inner integral portion when said envelope is inflated, means for applying fluid pressure to said envelope, and a flat coil spring having an outer end interconnected to the flat transverse surface to be modified and an inner end fixed to the outer end of said envelope to automatically cylindrically roll up said envelope when deflated.

2. An inflatable streamlining apparatus including an envelope having a bottom and a top, integral sides connected to said bottom and top portions, an outer streamlined end integral with all of said bottom, top, and side portions, an integral front portion adapted to be placed in supported engagement with a surface to be modified in shape, an air inlet valve in said envelope for applying or releasing pressure in said envelope, means for mounting said front surface of said envelope on the surface to be modified so that said surface backs up said front portion when said envelope is inflated, and a normally coiled up flat spring having an outer end fixed to said surface and an inner end fixed to said outer streamlined end to retract said envelope when deflated to cylindrically wrap up said envelope at the bottom portion of said surface.

3. An inflatable streamlining apparatus for a vertical transverse surface including an envelope having a bottom, a top, integral sides connected to said bottom and top of said envelope, an outer streamlined end integral with said bottom, top, and sides, an integral front portion adapted to be placed against and supported by the vertical transverse surface to be modified in shape, an air inlet valve in said envelope for applying or releasing pressure in said envelope, means for mounting said front surface of said envelope on the surface to be modified so that said surface to be modified backs up said front surface when said envelope is inflated, a retracting spring comprising a normally coiled up flat spring having an outer end secured to the surface to be modified and an inner end secured to the streamlined end of said envelope so that upon release of pressure in said envelope said spring automatically retracts and cylindrically rolls up said inflatable streamlining apparatus into a horizontal roll positioned at the lower edge of the vertical surface to be modified.

References Cited in the file of this patent

UNITED STATES PATENTS

| | | |
|---|---|---|
| 532,642 | Crowell | Jan. 15, 1895 |
| 1,042,320 | Chapman | Oct. 22, 1912 |
| 1,352,679 | Myers | Sept. 14, 1920 |
| 1,751,261 | Wilson | Mar. 18, 1930 |
| 1,977,546 | Fornelius | Oct. 16, 1934 |
| 2,584,369 | Renton | Feb. 5, 1952 |

FOREIGN PATENTS

| | | |
|---|---|---|
| 720,362 | France | Dec. 3, 1931 |
| 776,278 | France | Oct. 31, 1934 |
| 161,084 | Great Britain | Apr. 7, 1921 |
| 412,315 | Great Britain | June 28, 1934 |